United States Patent [19]

Scholz et al.

[11] Patent Number: 5,762,893

[45] Date of Patent: Jun. 9, 1998

[54] METHOD FOR CLEANING GASES CONTAINING OZONE-DEPLETING AND/OR CLIMATE-ACTIVE HALOGENATED COMPOUNDS

[75] Inventors: Christoph Scholz, Waakirchen; Walter Holzinger, Deisenhofen; Thomas Weber, Munich, all of Germany

[73] Assignee: CS-GmbH Halbleiter-und Solartechnologie, Ismaning, Germany

[21] Appl. No.: 698,004

[22] Filed: Aug. 13, 1996

[30] Foreign Application Priority Data

Sep. 1, 1995 [DE] Germany ............... 195 32 279.7

[51] Int. Cl.[6] .................. B01D 53/68; B01D 53/70
[52] U.S. Cl. .................. 423/240 S; 588/206; 588/248
[58] Field of Search ............ 423/240 S; 588/248, 588/206; 422/175; 165/4, 909, DIG. 9, DIG. 37

[56] References Cited

U.S. PATENT DOCUMENTS

| | | | |
|---|---|---|---|
| 2,083,732 | 6/1937 | Moore et al. | 165/4 |
| 2,121,733 | 6/1938 | Cottrell | 183/6 |
| 3,653,833 | 4/1972 | Watson et al. | 23/226 |
| 4,516,988 | 5/1985 | Winter | 55/59 |
| 5,024,817 | 6/1991 | Mattison | 422/111 |
| 5,151,116 | 9/1992 | Scholz et al. | 55/387 |
| 5,181,942 | 1/1993 | Jain | 55/31 |
| 5,366,708 | 11/1994 | Matros et al. | 423/210 |
| 5,578,276 | 11/1996 | Klobucar | 422/173 |
| 5,709,734 | 1/1998 | Scholz et al. | 95/131 |

FOREIGN PATENT DOCUMENTS

| | | |
|---|---|---|
| 0 599 271 A1 | 6/1994 | European Pat. Off. . |
| 549 531 | 4/1932 | Germany . |
| 32 32 138 C3 | 8/1982 | Germany . |
| 41 02 969 C1 | 2/1991 | Germany . |
| 4135018A1 | 6/1992 | Germany . |
| 44 04 329 A1 | 2/1994 | Germany . |

*Primary Examiner*—Gary P. Straub
*Assistant Examiner*—Timothy C. Vanoy
*Attorney, Agent, or Firm*—Flynn, Thiel, Boutell & Tanis, P.C.

[57] ABSTRACT

A method for cleaning waste gases containing ozone-depleting and/or climate-active halogenated compounds has a sorption device (S1,S2) having two chambers (1, 2) each containing a solid stationary sorbent (6, 7) for the ozone-depleting and/or climate-active halogenated compounds and communicate with each other via a heating device (4). The two chambers (1, 2) are alternatively connectable with the gas feeding means (8) for the waste gas to be cleaned for reversing the direction of flow of the waste gas to be cleaned.

11 Claims, 3 Drawing Sheets

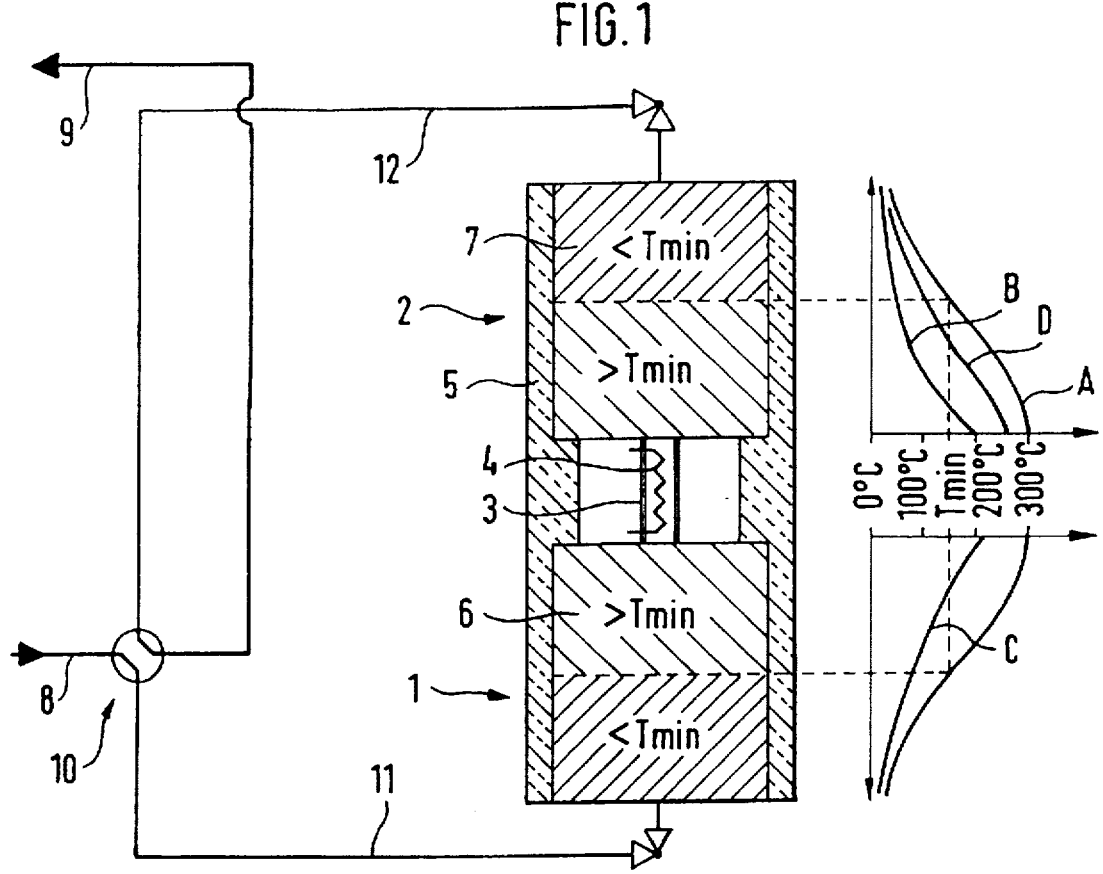
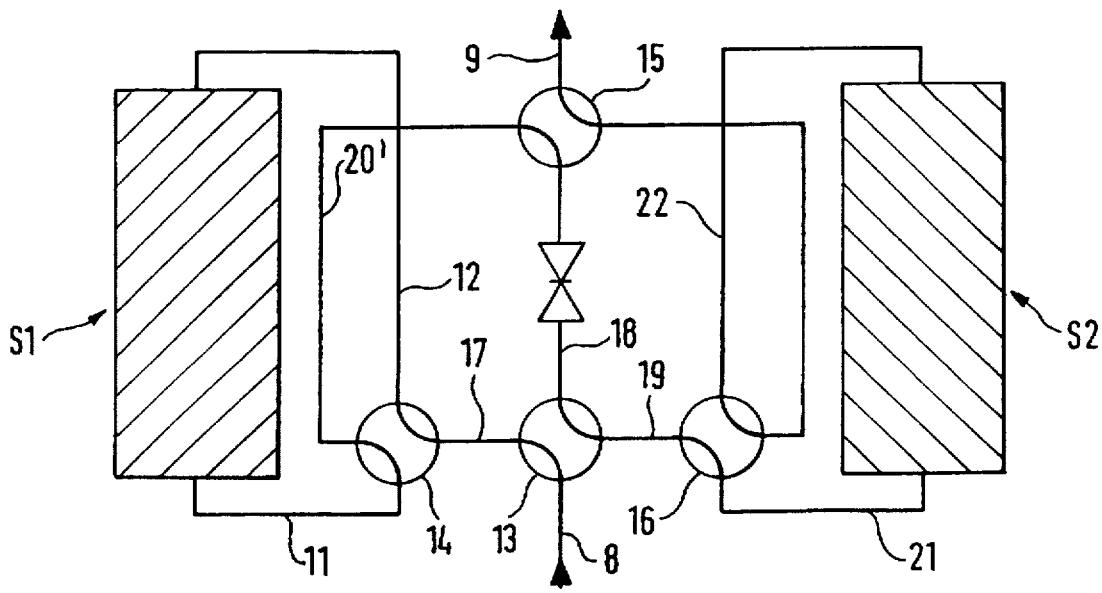

METHOD FOR CLEANING GASES CONTAINING OZONE-DEPLETING AND/OR CLIMATE-ACTIVE HALOGENATED COMPOUNDS

FIELD OF THE INVENTION

This invention relates to an apparatus and method for cleaning gases containing ozone-depleting and/or climate-active halogenated compounds.

DESCRIPTION OF THE PRIOR ART

In the semiconductor industry, great quantities of perfluorinated compounds, also referred to as PFCs, are used for dry etching. These include in particular carbon tetrafluoride ($CF_4$), trifluoromethane ($CHF_3$), hexafluoroethane ($C_2F_6$) as well as sulfur hexafluoride ($SF_6$) and nitrogen trifluoride ($NF_3$). Fluorine is formed from these compounds, for example, by electric discharge, being used for etching the semiconductor substrate, for example, a silicon wafer.

Perfluorinated compounds are extremely inert. They are therefore not caught by the waste-gas cleaning plants used in the semiconductor industry and are thus released into the atmosphere. Perfluorinated compounds are characterized by high climate activity, so-called GWP (Greenhouse Warming Potential). This holds in particular for sulfur hexafluoride, which has an extremely high GWP. Furthermore, some of these compounds are very toxic, for example, nitrogen trifluoride.

The problem of inertness arises not only in the waste-gas cleaning of perfluorinated compounds but also with other halogenated compounds, in particular halogenated hydrocarbons such as chlorinated hydrocarbons, chloroflurocarbon, bromofluorocarbons, etc. These substances are therefore also released into the atmosphere in great quantities. They contribute considerably to depleting the ozone layer in the stratosphere, thus having a high so-called ODP (Ozone Depletion Potential).

DE-A-44 04 329 discloses an apparatus and method for removing ozone-depleting and/or climate-active halogenated compounds wherein the halogenated compound is passed in a carrier gas stream through a heated phyllosilicate sorbent containing iron oxide or iron oxyhydroxide. A quantitative absorption of carbon tetrafluoride is thus obtained, e.g., with a bentonite fixed-bed reactor heated to about 300° C. and with nitrogen as the carrier gas. Since the sorbent has low heat conductivity, the fixed bed would have to be heated with very high energy consumption at a high gas throughput in industrial use. One could consider adding a heat exchanger before the fixed bed to maintain the necessary temperature of approx. 300° C. in the sorbent, even at a high gas throughput. In dry etching processes in semiconductor technology, however, the waste gas has a high fluorine content and thus an extremely high corrosiveness. A metallic heat exchanger can therefore not be used.

For removing volatile organic compounds, so-called VOCs, from the waste air from enameling lines, for example, one uses thermal regenerative waste-air cleaning. At least two towers provided with heat storage material are connected via a combustion chamber. The tower disposed before the combustion chamber in the direction of flow, which was previously brought to a high temperature, heats the waste air so that only a small amount of energy need be fed by the burner. In the course of time, the temperature in the preceding tower decreases while the following tower heats up due to the combustion gases consisting of the VOCs burned by the burner. When the cleaned waste air emerging from the following tower has reached a certain temperature, the following tower is sufficiently heated by the combustion gases, the direction of flow of the waste gas is reversed. This method is therefore also referred to as the "thermal swing" method.

The object of the invention is to provide an effective apparatus for eliminating ozone-depleting and/or climate-active halogenated compounds from waste gases for industrial use.

This is obtained according to the present invention by the inventive apparatus and advantageous embodiments of the inventive apparatus.

SUMMARY OF THE INVENTION

In the inventive apparatus, the two chambers of the sorption device are filled with a solid stationary sorbent for ozone-depleting or climate-active halogenated compounds. The sorbent leads to the decomposition of the ozone-depleting or climate-active halogenated compound. At the same time, it binds the decomposition products formed. As a result, the ozone-depleting or climate-active halogenated compounds are thus chemisorbed. Since the ozone-depleting or climate-active halogenated compounds are very inert, however, the sorbent must be heated to a high temperature.

When the inventive apparatus is put in operation, one first has an unloaded carrier gas, i.e., inert gas, such as nitrogen, flow through the sorption device with the heating device switched on. This heats up sorbent contained in the chamber following the heating device in the direction of flow.

When the carrier gas emerging from this chamber has exceeded a certain temperature, i.e., the sorbent has reached the temperature necessary for decomposing the ozone-depleting or climate-active halogenated compounds, the waste gas to be cleaned can be fed to this chamber while reversing the direction of flow.

Since the halogenated compounds are removed totally from the waste gas in this chamber, the following heating device is exposed to no corrosive compounds.

In the course of time, sorbent in the chamber preceding the heating device cools down, while cleaned waste gas heated by the heating device is constantly fed to the other chamber so that the sorbent in the chamber following the heating device heats up. As soon as the sorbent in the chamber following the heating device has in turn reached the temperature necessary for decomposing the ozone-depleting or climate-active halogenated compounds, the direction of flow of the waste gas is reversed, etc.

That is to say, the waste gas is fed alternately to one of the two chambers of the sorption device, while the other chamber has the outlet for the cleaned gas into the atmosphere.

The inventive apparatus is thus ready for operation very quickly, for example after only one hour. The subsequent alternating feeding of waste gas can take place at intervals of, for example, 5 to 30 minutes. After a few hours, both chambers have reached the optimal final state in which a quantitative elimination of ozone-depleting or climate-active halogenated compounds from waste gases is achievable with a minimal energy supply and a high space velocity of, for example, 1000 $^{-1}$ and more.

When the system has reached the final state, the heating device substantially needs only provide the heat which the apparatus radiates. At a waste gas, i.e., nitrogen, throughput of for example 100 l/min and a temperature of the sorbent of approx. 300° C., the heating power of the heating device is, for example, only about 150 watts.

Ozone-depleting and/or climate-active halogenated compounds which can be removed with the inventive apparatus from a gas stream, in particular, an inert gas stream such as a nitrogen stream, include fluorocarbons, chlorinated hydrocarbons, chlorofluorocarbons, bromofluorocarbons, bromochlorofluorocarbons and partly halogenated fluorocarbons and chlorofluorocarbons having 1 to 4 carbon atoms, in particular, trichlorofluoromethane, dichlorodifluoromethane, bromochlorodifluoromethane, dibromodifluoromethane, chlorotrifluoromethane, bromotrifluoromethane, tetrafluoromethane, dichlorofluoromethane, chlorodifluoromethane, trifluoromethane (fluoroform), difluoromethane (methyl fluoride), 1,1,2,2-tetrachlorodifluoroethane, 1,1,2-hexafluoroethane, 1,2-dibromo-1,1-difluoroethane, 2-chloro-1,1,1-trifluoroethane, 1-chloro-1,1-difluoroethane, 1,1,1-trifluoroethane, 1,1-difluoroethane, octafluoropropane, octafluorocyclobutane, decafluorobutane, 1,1-dichlorodifluoroethylene, chlorotrifluoroethylene (trifluorovinylchloride), 1-chloro-2,2-difluoroethylene, 1,1-difluoroethylene (vinylidene fluoride).

The inventive apparatus is not only suitable for disposing of chlorofluorocarbons, fluorocarbons and chlorinated hydrocarbons, however, but also for halogenated hydrocarbons in general, e.g., halons, carbon tetrachloride, methyl chloroform or partly halogenated halons.

An important area of application for the inventive apparatus is the cleaning of waste gases arising from dry etching with perfluorinated compounds (PFCs) in the semiconductor industry. PFCs are not only used for etching the semiconductor components, e.g., silicon wafers, but serve at the same time as a cleaning gas for the chambers for producing the semiconductor elements.

The PFCs used are not only tetrafluoromethane, trifluoromethane and hexafluoroethane but also very toxic nitrogen trifluoride and sulfur hexafluoride having an especially high GWP.

The halogenated compound is fed to the sorption device in an inert carrier gas, e.g. nitrogen or a rare gas.

The content of halogenated compound in the waste gas or nitrogen carrier gas can be 1 vol % and more, e.g., 1 to 20 vol %.

The solid stationary sorbent preferably contains iron oxide, iron oxyhydroxide, an iron hydroxy salt and/or iron oxyhydroxy salt. This sorbent is described in detail in DE-A44 04 329. The iron oxyhydroxide can be goethite and the iron oxide maghemite, magnetite, ferrihydrite or hematite. The sorbent furthermore preferably has a phyllosilicate with a proportion of at least 10 wt %, preferably at least 50 wt %. The phyllosilicate can be a mineral of the Montmorin group, talc and/or a mineral of the mica group. As minerals of the Montmorin group, one can use bentonites and closely related clay materials, such as montmorillonite, nontronite, saponite or vermiculite. As minerals of the mica group, for example muscovite, biotite, illite, phlogopite, lepidolite, margarite, paragonite and chloritoid. Kaolins or chamosite, as well as serpentine minerals, can likewise be applied.

For the ozone-depleting or climate-active halogenated compound to be decomposed, the sorbent must be heated in the chamber preceding the heating device in the direction of flow to the necessary decomposition temperature, which is generally between 150° and 450° C.

It is not necessary for the entire sorbent in the chamber preceding the heating device to have this high decomposition temperature. It instead suffices if only the zone of the sorbent adjacent the heating device is heated to the decomposition temperature of the ozone-depleting and/or climate-active halogenated compounds, while the remaining part of the sorbent forms a zone with a lower temperature.

In this low-temperature zone, the more reactive compounds in the waste gas arising in the particular industrial process are then bound. For example, the waste gas arising from dry etching in the semiconductor industry with PFC contains fluorine gas ($F_2$), silicon tetrafluoride, fluorophosgene ($COF_2$) and such reactive gases which are already absorbed at room temperature. The sorbent used for the low-temperature zone can be the same or a different sorbent from the sorbent used for chemisorption of the ozone-depleting and/or climate-active halogenated compounds in the hot zone.

The inventive apparatus can also be used for disposing of ozone-depleting and/or climate-active halogenated compounds. For this purpose the halogenated compounds are fed to the inventive apparatus in a carrier gas, in particular, nitrogen, in the vapor state. One must bear in mind that gigantic quantities of these compounds must be disposed of.

The used-up sorbent should be able to be disposed of safely and without great effort.

According to the invention one can preferably make use of the sorption column of DE-A-41 02 969 for this purpose. This column can be formed from two stackable drums or similar vessels each having a valve in the cover and a valve in the bottom. The lower drum can be placed on a lower gas connecting piece, and an upper gas connecting piece can be connected to the upper drum. For this purpose, the lower and upper gas connecting pieces each have a coupling piece designed to be assembled with the valve in the bottom of the lower drum or with the valve in the cover of the upper drum. The valve in the cover of the lower vessel is likewise designed to be assembled with the valve in the bottom of the vessel stacked thereon in the known sorption column. When all valves are assembled, a gas space is formed communicating from the lower gas connecting piece to the upper gas connecting piece.

To form the inventive apparatus, the known sorption column need substantially only be provided with an intermediate piece having the heating device for assembling the valve in the cover of the lower vessel with the valve in the bottom of the upper vessel. Further, the vessels are preferably provided with heat insulation.

BRIEF DESCRIPTION OF THE DRAWINGS

In the following, the invention will be explained more closely by way of example with reference to the drawing, in which:

FIG. 1 schematically shows a waste-gas cleaning apparatus with a sorption device having two chambers, and a diagram showing the working temperature profile in the sorption device;

FIG. 2 schematically shows two series-connected sorption devices each having two chambers;

DESCRIPTION OF THE PREFERRED EMBODIMENT

Figure 3:
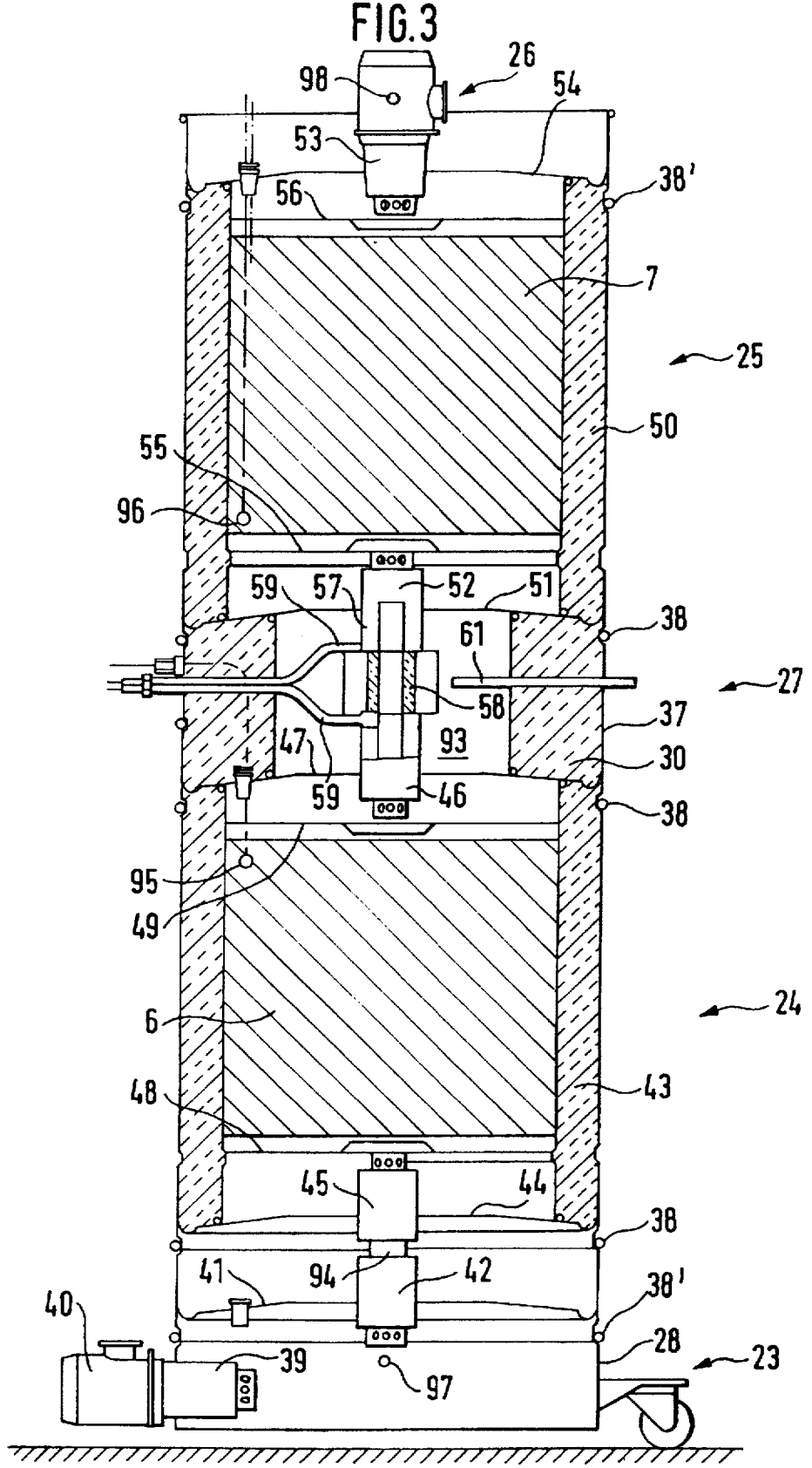
FIG. 3 shows a longitudinal section through an embodiment of a sorption device as in FIG. 1 or FIG. 2.

According to FIG. 1 the apparatus has two chambers 1 and 2 connected by intermediate piece 3 formed as a pipe and provided with an electric heating device 4. Chambers 1 and 2 and intermediate piece 3 are surrounded by heat insulation 5. Chambers 1 and 2 are filled with solid, stationary sorbent 6, 7 which can be granular or have another lumpy form or be a formed body, e.g., a honeycomb body.

The waste gas to be cleaned containing the ozone-depleting and/or climate-active halogenated compounds is fed, e.g., in a nitrogen stream via waste-gas pipe 8, while the cleaned waste gas emerges into the atmosphere via outlet pipe 9. Waste-gas pipe 8 and outlet pipe 9 are connected to a valve device, for example 4/2-port directional control valve 10, whose two other connections are connected with pipes 11 and 12 opening into chamber 1 with sorbent 6 and chamber 2 with sorbent 7, respectively.

Chambers 1 and 2 and intermediate piece 3 form a gas space whose temperature during operation (in the final state) is rendered for example by curve A on the right in FIG. 1.

That is, in each chamber 1, 2, the temperature rises, for example, from room temperature at the place where pipe 11, 12 is connected to a temperature of, for example, 300° C. at the place where intermediate piece 3 is connected with heating device 4.

Tmin in FIG. 1 designates the minimum temperature which must exist for the ozone-depleting and/or climate-active halogenated gas being removed to be decomposed and thus chemisorbed. Tmin is, for example, approx. 150° C. The zone with the temperature>Tmin is separated from the zone with the temperature<Tmin by a broken line in FIG. 1.

For heating, heating device 4 is switched on. Unloaded $N_2$ is thereby fed via pipe 8. 4/2-port valve 10 is located in the position shown in FIG. 1. The unloaded $N_2$ is fed to chamber 1 until chamber 2 has a temperature approximately according to curve B due to the $N_2$ heated by heating device 4. Sorbent 7 in chamber 2 adjacent heating device 4 is thus at a temperature>Tmin. The $N_2$ gas emerging from chamber 2 into pipe 12 then has a temperature of, e.g., 30° to 40° C. Now, 4/2-port valve 10 is reversed so that the waste gas containing the ozone-depleting and/or climate-active halogenated compounds in pipe 8 is fed via pipe 12 to chamber 2 with sorbent 7 heated according to curve B. Said halogenated compounds are thus chemisorbed in sorbent 7.

The cleaned waste gas heated by sorbent 7, after being heated further in the intermediate piece with heating device 4, streams into chamber 1 with sorbent 6 until chamber 1 assumes the temperature according to curve C in FIG. 1.

4/2-port valve 10 is now switched back to the position shown in FIG. 1 so that the waste gas flows via pipe 11 into chamber 1, intermediate piece 3, chamber 2 and then via pipe 9 into the open, until sorbent 7 in chamber 2 has the temperature according to curve D in FIG. 1. This reversal of valve 10 is repeated several times, finally obtaining temperature A as the final state. The reversal of 4/2-port valve 10 in the final state is then performed until sorbent 6, 7 in chambers 1 and 2 is so loaded with the decomposition products of said halogenated compounds that it must be replaced.

To avoid having to interrupt waste-gas cleaning when replacing sorbent 6, 7 it is expedient to use two sorption devices S1 and S2 according to FIG. 2.

Sorption devices S1 and S2 are constructed in the way shown in FIG. 1. That is, they consist, according to FIG. 1 of two chambers 1, and 2 connected via intermediate piece 3 with heating device 4.

In FIG. 2, four valve devices are provided, namely 4/2-port directional control valves 13, 14, 15 and 16. Waste-gas pipe 8 is connected to valve 13, which is connected via pipe 17 with 4/2-port valve 14, via pipe 18 with 4/2-port valve 15 and via pipe 19 with 4/2-port valve 16.

4/2-port valve 14 is connected via pipe 11 with chamber 1 on the one hand and via pipe 12 with chamber 2 on the other hand (compare FIG. 1) of sorption device S1, and via pipe 20 with valve 15, to which outlet pipe 9 is connected. 4/2-port valve 16 is connected via pipe 21 with chamber 1 on the one hand and via pipe 22 with chamber 2 on the other hand (FIG. 1) of sorption device S2.

In the operative position shown in FIG. 2, heating devices 4 (FIG. 1) of sorption devices S1 and S2 are switched on. The waste gas is fed via pipe 8 first to sorption device S1, according to FIG. 2, to upper chamber 2 (FIG. 1) so that said halogenated compound is chemisorbed therein while chamber 1 of sorption device S1 is being heated. By reversing valve 14 one reverses the direction of flow in sorption device S1 whenever the gas emerging from sorption device S1 exceeds a certain temperature of, e.g. 30° C.

The cleaned waste gas emerging from sorption device 1 is fed according to FIG. 2 via valve 15 to sorption device S2 in which the direction of flow can be reversed in its turn by reversing valve 16. The waste gas emerging from sorption device S2 passes finally via valve 15 and outlet pipe 9 into the open.

Sorption device S2 thus always provides an unloaded sorption device ready for operation. At the same time, sorption device S2 cleans the waste-gas volumes present in the colder zone<Tmin of sorbent 6, 7 when the direction of flow in sorption device S1 is changed by reversing 4/2-port valve 14.

When sorbent 6, 7 in sorption device S1, S2 is loaded, it is replaced by fresh sorbent. Waste-gas cleaning can then be performed temporarily only with the other, unloaded sorption device S2, S1. It is of course also possible to series-connect three sorption devices in the way shown in FIG. 2.

The loaded sorbent must be disposed of. So that this can be done safely and without great effort, the sorption device of FIG. 3 can be used.

One accordingly provides lower gas connecting piece or base 23 on which lower, drum-shaped vessel 24 is placed, and upper drum-shaped vessel 25 to which upper gas connecting piece 26 is connected.

Between lower drum 24 and upper drum 25 there is intermediate piece 27.

Lower gas connecting piece 23 and intermediate piece 27 have peripheral wall 28, 30 with a diameter corresponding to the diameter of drums 24, 26.

The upper rim of peripheral wall 28 of lower gas connecting piece 23 and the lower and upper rims of drums 24, 25 and peripheral wall 30 of intermediate piece 27 are provided with flanges 38 overlapping each other so that lower drum 24 can be placed on lower gas connecting piece 23, intermediate piece 27 on lower drum 24, and upper drum 25 on intermediate piece 27. Flange connections 38 are each secured by a straining ring not shown.

Lower gas connecting piece 23 has valve 39 in peripheral wall 28 into which pipe 11, 12, not shown in FIG. 3, can be inserted with coupling piece 40.

Gas connecting piece 23 is provided with cover 41 in the middle of which valve 42 is disposed. Cover 41 is fastened to peripheral wall 28 with flange connection 38 with a straining ring, as outlined above with reference to other flanges 38.

Lower drum 24 has jacket 43 made of heat-insulating material. In the middle of its bottom 44 there is valve 45.

Another valve 46 is located in detachable cover 47. Above valve 45 and below valve 46 there is perforated plate or similar gas-permeable wall 48, 49 in each case. Solid sorbent 6 is located therebetween.

Upper drum 25 is designed in the same way. That is, it has jacket 50 made of heat-insulating material. In its bottom 51 there is valve 52, and in its detachable cover 54 with flange 38; there is valve 53. Perforated plates 55, 56 are likewise provided, between which sorbent 7 is located.

Upper gas connecting piece 26 is formed by a coupling piece which is inserted in valve 53 in cover 54 of upper drum 25 and to which pipe 11, 10 (FIG. 1) is connected.

Intermediate pipe 27 has tubular coupling piece 57 adapted to be inserted with one end in valve 46 in cover 47 of lower drum 24 and with the other end in valve 52 in bottom 51 of upper drum 25.

Pipe 57 contains electric heating device 58 supplied via electric lines 59 guided through peripheral wall 37 provided on the inside of jacket 30 made of heat-insulating material, as well as nitrogen pipe 61 whose function will be explained more closely in the following in connection with FIG. 4.

Figure 4:
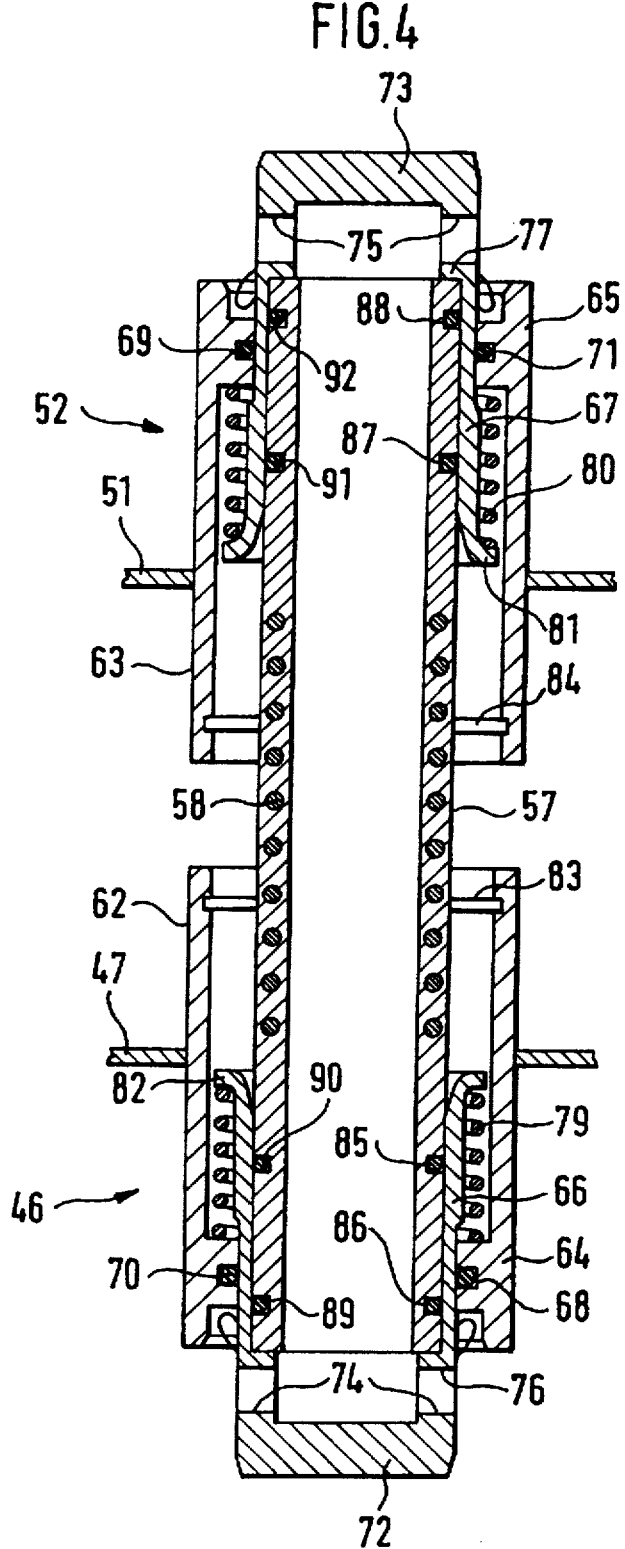
FIG. 4 shows a view enlarged over FIG. 3 of a longitudinal section through the sorption device in the area of the intermediate piece.

Valves 39, 42, 45, 46, 52 and 53 can be designed for example as shown in FIG. 4 by valve 46 in cover 47 of lower drum 24 or valve 52 in bottom 51 of upper drum 25.

Each valve 46, 52 accordingly has cylindrical valve housing 62, 63 welded into drum cover 47 or drum bottom 51. Valve housing 62, 63 is provided at its end facing the interior of corresponding drum 24, 25 with inside ring 64, 65 on which sheath-shaped valve gate 66, 67 is guided slidably and gastight. For this purpose ring 64, 65 has groove 68, 69 on its inside in which sealing ring 70, 71 is disposed. Sheath-shaped valve gate 66, 67 is closed on its end facing the interior of corresponding drum 24, 25 by bottom 72, 73, whereby it has gas traversing bores 74, 75 on its peripheral wall before bottom 72, 73.

Pipe 57, which is inserted in the open end of sheath-shaped valve gate 66, 67, interconnects valve gates 66, 67 and is supported on inside ring 76, 77 on valve gate 66, 67 which is disposed on the side of gas traversing bores 74, 75 facing away from bottom 72, 73.

Valves 46, 52, which are shown in the open position in FIG. 4, are spring-loaded in the closed position. For this purpose, one provides a valve spring designed as pressure spring 79, 80 which is supported on inside ring 64, 65 on valve housing 62, 63, on the one hand, and on valve gate 66, 67, on the other hand. When valve gates 66, 67 move into the closed position, bottom 72, 73 moves to the level of rings 64, 65 thereby closing gas traversing bores 74, 75. For valve gates 66, 67 to be fixed in the closed position of valves 46, 52, one provides on the inside of valve housing 62, 63 ring-shaped stops 83, 84 on which outside ring flanges 81, 82 rest in the closed position. To seal tubular intermediate piece 27 off from valve gates 66, 67, one provides at both ends of pipe 57 grooves 85 to 88 in which sealing rings 89 to 92 are provided.

Sealing rings 70, 71 and 89 to 92 are exposed to the high temperatures of the waste gas heated by heating device 58. This can impair their sealing function. To prevent waste gas from escaping in intermediate piece 27, one feeds nitrogen into chamber 93 between pipe 57 and peripheral wall 37 or jacket 60 via pipe 61 (FIG. 3) at a pressure which is higher than the pressure of the waste gas in pipe 57.

Tubular coupling piece 94 is likewise provided between valve 42 in lower gas connecting piece 23 and valve 45 in bottom 44 of lower drum 24. Coupling pieces 26, 40 likewise have tubular portions inserted in the open ends of the sheath-shaped valve gates (not shown) of valves 53 and 39.

Thermoelements or similar temperature measuring devices 95, 96 are provided in sorbents 6, 7, respectively, adjacent intermediate piece 27. Further, thermoelements or similar temperature measuring devices 97, 98 are provided in lower and upper gas connecting pieces 23, 26, respectively (FIG. 3).

One can thus dispense completely with seals 70, 71 and 89 to 92. The $N_2$ overpressure in chamber 92 forms a gas seal which prevents waste gas from escaping from pipe 57 and valves 46, 51.

We claim:

1. A method of cleaning waste gas containing ozone-degrading halogenated compounds and/or halogenated compounds having a high Greenhouse Warming Potential, said method comprising the steps of:

a) providing a sorption device having two chambers, each of the two chambers containing a solid stationary sorbent for the ozone-degrading halogenated compounds and/or halogenated compounds having a high Greenhouse Warming Potential, and a heating device provided between and communicating with the two chambers;

b) passing a gas through the heating device to heat the gas therein and heating a portion of the sorbent in one chamber to a minimum temperature necessary to decompose the ozone-degrading halogenated compounds and/or halogenated compounds having a high Greenhouse Warming Potential with the heated gas;

c) feeding the waste gas into the chamber having the heated sorbent before the waste gas passes through the heating device to decompose the ozone-degrading halogenated compounds and/or halogenated compounds while chemisorbing the degradation products having a high Greenhouse Warming Potential and form a cleaned waste gas;

d) passing the cleaned waste gas through the heating device to heat the cleaned waste gas and heating a portion of the sorbent in the other chamber to the minimum temperature necessary to decompose the ozone-degrading halogenated compounds and/or halogenated compounds having a high Greenhouse Warming Potential with the heated and cleaned waste gas;

e) reversing the gas flow by feeding the waste gas into the other chamber having the heated sorbent before the waste gas passes through the heating device to decompose the ozone-degrading halogenated compounds and/or halogenated compounds having a high Greenhouse Warming Potential and form the cleaned waste gas;

f) passing the cleaned waste gas through the heating device to heat the cleaned waste gas and reheating the portion of the sorbent in the one chamber to the minimum temperature necessary to decompose the ozone-degrading halogenated compounds and/or halogenated compounds while chemisorbing the degradation products having a high Greenhouse Warming Potential; and g) repeating steps c) through f).

2. The method of claim 1, characterized in that the gas of step b) is an inert gas.

3. The method of claim 2, characterized in that the inert gas is nitrogen.

4. The method of claim 1, characterized in that the waste gases contain the ozone-degrading halogenated compounds and/or halogenated compounds having a high Greenhouse Warming Potential in an inert carrier gas.

5. The method of claim 4, characterized in that the inert carrier gas is nitrogen.

6. The method of claim 1, characterized in that the minimum temperature is at least 150° C.

7. The method of claim 1, characterized in that the sorbent is heated to a temperature of between 150°–500° C.

8. The method of claim 1, characterized in that the halogenated compounds are at least one member selected from the group consisting of fluorocarbons, chlorinated hydrocarbons, chlorofluorocarbons, bromofluorocarbons, bromochlorofluorocarbons and partially halogenated fluorocarbons.

9. The method of claim 1, characterized in that the sorbent contains at least one member selected from the group consisting of iron oxide, iron oxyhydroxide, an iron hydroxy salt and an iron oxyhydroxy salt.

10. The method of claim 9, characterized in that the sorbent further contains a phyllosilicate.

11. The method of claim 1, characterized in that the temperature is between 150°–450° C..

* * * * *